US 11,178,168 B1

(12) United States Patent
Lin et al.

(10) Patent No.: US 11,178,168 B1
(45) Date of Patent: Nov. 16, 2021

(54) SELF-LEARNING CYBERSECURITY THREAT DETECTION SYSTEM, METHOD, AND COMPUTER PROGRAM FOR MULTI-DOMAIN DATA

(71) Applicant: Exabeam, Inc., Foster City, CA (US)

(72) Inventors: Derek Lin, San Mateo, CA (US); Anying Li, San Francisco, CA (US); Ryan Foltz, Foster City, CA (US); Domingo Mihovilovic, Menlo Park, CA (US); Sylvain Gil, San Francisco, CA (US); Barry Steiman, San Ramon, CA (US)

(73) Assignee: Exabeam, Inc., Foster City, CA (US)

( * ) Notice: Subject to any disclaimer, the term of this patent is extended or adjusted under 35 U.S.C. 154(b) by 194 days.

(21) Appl. No.: 16/720,732

(22) Filed: Dec. 19, 2019

Related U.S. Application Data

(60) Provisional application No. 62/782,824, filed on Dec. 20, 2018.

(51) Int. Cl.
*H04L 29/06* (2006.01)
(52) U.S. Cl.
CPC ........ *H04L 63/1433* (2013.01); *H04L 63/145* (2013.01); *H04L 63/1425* (2013.01); *H04L 63/1466* (2013.01)
(58) Field of Classification Search
CPC ............. H04L 63/1433; H04L 63/1425; H04L 63/145; H04L 63/1466
See application file for complete search history.

(56) References Cited

U.S. PATENT DOCUMENTS

| | | |
|---|---|---|
| 6,223,985 B1 | 5/2001 | DeLude |
| 6,594,481 B1 | 7/2003 | Johnson et al. |
| 8,326,788 B2 | 12/2012 | Allen et al. |
| 8,443,443 B2 | 5/2013 | Nordstrom et al. |
| 8,479,302 B1 | 7/2013 | Lin |
| 8,539,088 B2 | 9/2013 | Zheng |
| 8,606,913 B2 | 12/2013 | Lin |
| 8,676,273 B1 | 3/2014 | Fujisake |

(Continued)

OTHER PUBLICATIONS

DatumBox Blog, "Machine Learning Tutorial: The Naïve Bayes Text Classifier", DatumBox Machine Learning Blog and Software Development News, Jan. 2014, pp. 1-11.

(Continued)

*Primary Examiner* — Vance M Little
(74) *Attorney, Agent, or Firm* — Lessani Law Group, PC

(57) ABSTRACT

The present disclosure describes a self-learning system, method, and computer program for detecting cybersecurity threats in a computer network based on anomalous user behavior and multi-domain data. A computer system tracks user behavior during a user session across multiple data domains. For each domain observed in a user session, a domain risk is calculated. The user's session risk is then calculated as the weighted sum of the domain risks. A domain risk is based on individual event-level risk probabilities and a session-level risk probability from the domain. The individual event-level risk probabilities and a session-level risk probability for a domain are derived from user events of the domain during the session and are based on event-feature indicators and session-feature indicators for the domain.

27 Claims, 5 Drawing Sheets

(56) References Cited

U.S. PATENT DOCUMENTS

| | | | |
|---|---|---|---|
| 8,881,289 B2 | 11/2014 | Basavapatna et al. | |
| 9,055,093 B2 | 6/2015 | Borders | |
| 9,081,958 B2 | 7/2015 | Ramzan et al. | |
| 9,189,623 B1 | 11/2015 | Lin et al. | |
| 9,680,938 B1 | 6/2017 | Gil et al. | |
| 9,692,765 B2 | 6/2017 | Choi et al. | |
| 9,760,240 B2 | 9/2017 | Maheshwari et al. | |
| 9,779,253 B2 | 10/2017 | Mahaffey et al. | |
| 9,798,883 B1* | 10/2017 | Gil | G06F 21/577 |
| 9,843,596 B1 | 12/2017 | Averbuch et al. | |
| 9,898,604 B2 | 2/2018 | Fang et al. | |
| 10,063,582 B1* | 8/2018 | Feng | G06F 21/575 |
| 10,095,871 B2 | 10/2018 | Gil et al. | |
| 10,178,108 B1 | 1/2019 | Lin et al. | |
| 10,419,470 B1 | 9/2019 | Segev et al. | |
| 10,474,828 B2 | 11/2019 | Gil et al. | |
| 10,496,815 B1 | 12/2019 | Steiman et al. | |
| 2002/0107926 A1 | 8/2002 | Lee | |
| 2003/0147512 A1 | 8/2003 | Abburi | |
| 2004/0073569 A1 | 4/2004 | Knott et al. | |
| 2006/0090198 A1 | 4/2006 | Aaron | |
| 2007/0156771 A1 | 7/2007 | Hurley et al. | |
| 2007/0282778 A1 | 12/2007 | Chan et al. | |
| 2008/0040802 A1 | 2/2008 | Pierson et al. | |
| 2008/0170690 A1 | 7/2008 | Tysowski | |
| 2008/0301780 A1* | 12/2008 | Ellison | G06F 21/6218 726/4 |
| 2009/0144095 A1 | 6/2009 | Shahi et al. | |
| 2009/0293121 A1 | 11/2009 | Bigus et al. | |
| 2010/0125911 A1 | 5/2010 | Bhaskaran | |
| 2010/0269175 A1 | 10/2010 | Stolfo et al. | |
| 2012/0278021 A1 | 11/2012 | Lin et al. | |
| 2012/0316835 A1 | 12/2012 | Maeda et al. | |
| 2013/0080631 A1 | 3/2013 | Lin | |
| 2013/0117554 A1 | 5/2013 | Ylonen | |
| 2013/0197998 A1 | 8/2013 | Buhrmann et al. | |
| 2013/0227643 A1 | 8/2013 | Mccoog et al. | |
| 2013/0305357 A1 | 11/2013 | Ayyagari et al. | |
| 2013/0340028 A1 | 12/2013 | Rajagopal et al. | |
| 2014/0315519 A1 | 10/2014 | Nielsen | |
| 2015/0046969 A1 | 2/2015 | Abuelsaad et al. | |
| 2015/0121503 A1 | 4/2015 | Xiong | |
| 2015/0339477 A1 | 11/2015 | Abrams et al. | |
| 2015/0341379 A1 | 11/2015 | Lefebvre et al. | |
| 2016/0005044 A1 | 1/2016 | Moss et al. | |
| 2016/0021117 A1 | 1/2016 | Harmon et al. | |
| 2016/0306965 A1* | 10/2016 | Iyer | G06Q 10/105 |
| 2016/0364427 A1 | 12/2016 | Wedgeworth, III | |
| 2017/0024135 A1 | 1/2017 | Christodorescu et al. | |
| 2017/0155652 A1 | 6/2017 | Most et al. | |
| 2017/0161451 A1 | 6/2017 | Weinstein et al. | |
| 2017/0213025 A1 | 7/2017 | Srivastav et al. | |
| 2017/0236081 A1 | 8/2017 | Grady Smith et al. | |
| 2017/0318034 A1 | 11/2017 | Holland et al. | |
| 2018/0004961 A1 | 1/2018 | Gil et al. | |
| 2018/0048530 A1 | 2/2018 | Nikitaki et al. | |
| 2018/0144139 A1 | 5/2018 | Cheng et al. | |
| 2018/0165554 A1 | 6/2018 | Zhang et al. | |
| 2018/0234443 A1 | 8/2018 | Wolkov et al. | |
| 2018/0307994 A1 | 10/2018 | Cheng et al. | |
| 2019/0034641 A1 | 1/2019 | Gil et al. | |
| 2019/0124045 A1 | 4/2019 | Zong et al. | |
| 2019/0213247 A1 | 7/2019 | Pala et al. | |
| 2019/0334784 A1 | 10/2019 | Kvernvik et al. | |

OTHER PUBLICATIONS

Freeman, David, et al., "Who are you? A Statistical Approach to Measuring User Authenticity", NDSS, Feb. 2016, pp. 1-15.

Ioannidis, Yannis, "The History of Histograms (abridged)", Proceedings of the 29th VLDB Conference (2003), pp. 1-12.

Malik, Hassan, et al., "Automatic Training Data Cleaning for Text Classification", 11th IEEE International Conference an Data Mining Workshops, 2011, pp. 442-449.

Wang, Alex Hai, "Don't Follow Me Spam Detection in Twitter", International Conference on Security and Cryptography, 2010, pp. 1-10.

Chen, Jinghui, et al., "Outlier Detection with Autoencoder Ensembles", Proceedings of the 2017 SIAM International Conference on Data Mining, pp. 90-98.

* cited by examiner

Example: Conditional independent feature groups of VPN domain

| Group | event-level features |
|---|---|
| group 1 | anomalous VPN realm for user<br>anomalous VPN realm for user's peer<br>anomalous destination host for user<br>anomalous destination host for peer group |
| group 2 | anomalous source host for user<br>anomalous source host for organization<br>anomalous OS for user<br>anomalous source IP for user |
| group 3 | anomalous VPN activity for user<br>anomalous VPN activity for peer group |
| group 4 | failed login<br>source IP is on blacklist<br>user is a contractor or a partner<br>account is disabled |

FIG. 5

SELF-LEARNING CYBERSECURITY THREAT DETECTION SYSTEM, METHOD, AND COMPUTER PROGRAM FOR MULTI-DOMAIN DATA

RELATED APPLICATIONS

This application claims the benefit of U.S. Provisional Application No. 62/782,824, filed on Dec. 20, 2018, and titled "BEAM: An Anomaly-Based Threat Detection System for Enterprise Multi-Domain Data," the contents of which are incorporated by reference herein as if fully disclosed herein.

BACKGROUND OF THE INVENTION

1. Field of the Invention

This invention relates generally to security analytics in computer networks, and, more specifically, to a self-learning threat detection system for multi-domain data.

2. Description of the Background Art

Organizations are faced with the ever-increasing risks from security threats. Some cyberattacks are perpetrated by outsiders, while others involve insiders. The insider threats are particularly hard to guard against, whether they are from someone using their legitimate access to data for nefarious purposes or conducting network activities in ways that violate acceptable user policies. Since the malicious activities and methods from an insider or an external adversary are always changing, traditional means of detecting threats that match data against blacklisted signatures or hand-crafted correlation rules are largely ineffective and irrelevant. In recent years, behavior-based anomaly detection systems have emerged to address these security threats. In particular user and entity behavior analytics (UEBA) provide a viable approach to detecting behavior anomalies. An example of a UBA/UEBA cybersecurity monitoring system is described in U.S. Pat. No. 9,798,883 issued on Oct. 24, 2017 and titled "System, Method, and Computer Program for Detecting and Assessing Security Risks in a Network," the contents of which are incorporated by reference herein.

Current UEBA systems rely on risk rules to identify cybersecurity threats. A session is evaluated to see whether the criteria of any rules are satisfied using current session data and behavior models that encompass historical network data. In most cases, a rule is triggered when an anomaly specified by the rule is detected in a user session. Each rule is associated with expert-assigned risk points, and, when a rule is triggered in a user session, the risk points associated with the rule are added to the user's session risk score. The user's session risk score is based on the cumulative sum of the risk points.

While this is can be effective way to detect cybersecurity threats, the number of rules in a UEBA system tends to grow over time as new types of threats and ways to engage in malicious activity are discovered. The increasing number of rules results in risk score inflation and an increased number of alerts. To counter this, the system often requires manual tuning and adjusting of risk scores. Furthermore, while-rule based systems use behavior models to determine whether an event is anomaly, they require a human to assign risk points to detected anomalies. These points must be updated over time.

Moreover, enterprise security products generate a large variety and volume of entity or user activity event data of different categories or "domains." Example activity domains include asset logon and access, account management, virtual private network (VPN), email, proxy/firewall, and physical access, etc. What may be activity of high interest in one domain may be of low interest in another domain with respect to risk assessment.

Therefore, in certain environments, there is demand for a UEBA system where the risk score is not based on a cumulation of human-assigned risk points associated with triggered rules, but is instead a probability-based model based on behavior profiles that factors in the domain and context in which an event occurs and that enables the system to self-learn the risks associated with observed events.

SUMMARY OF THE DISCLOSURE

The present disclosure describes a self-learning system, method, and computer program for detecting cybersecurity threats in a computer network based on anomalous user behavior and multi-domain data.

A computer system tracks user behavior during a user session across multiple data domains. For each domain observed in a user session, a domain risk score is calculated. The user's session risk score is then calculated as the weighted sum of the domain risk scores.

A domain risk score is based on learned individual event-level risk probabilities and a learned session-level risk probability from the domain. The individual event-level risk probabilities and a session-level risk probability for a domain are derived from user events of the domain during the session and from historical event and session data for the domain. Consequently, unlike most of rule-based systems, the user's session risk score is not cumulative sum of expert-assigned risk points associated with individual triggered rules, but instead it is based on cumulative learned risk probabilities calculated on a per-domain basis.

An alert is generated for sessions with risk scores above a threshold. In certain embodiments, a domain diversity factor is used to preference, in terms of risk ranking, sessions in which rarer domains or rarer combinations of domains are observed.

In certain embodiments, each domain is associated with a unique set of event-feature indicators comprising event-level anomaly indicators and event-level context indicators. In such embodiments, the event-level risk probability for an event of a domain is a Bayes risk probability assessed based on the evaluated values of the domain's event-feature indicators for the event, as well as on historical event data for the domain. The historical event data for the domain includes an individual user's historical event data in the domain and historical event data in the domain for the global (network-wide) user population.

Likewise, each domain may be associated with a unique set of session-feature indicators comprising session-level anomaly indicators and session-level context indicators. In such embodiments, the session-level risk probability for a domain is a Bayes risk probability assessed based on the evaluated values of the domain's session-feature indicators as a result of events of the domain during a user session. The session-level Bayes risk probability is also based on historical individual and global session data for the domain.

One of the advantages of this method is that the system does not require humans to determine and periodically update the level of risk associated with an event or an anomaly (i.e., no expert-assigned risk points for triggered rules). Rather, since event-level and session-level risks are calculated as a probability based on the user's current and historical observed behavior in a domain, as well as the global population's historical observed behavior for the domain, the system is able to learn the risks itself and improve its understanding of risks as it receives more data over time. In other words, network data drives risk assessments, not human-assigned risk points. This often leads to more accurate risk calculations for user sessions.

Another advantage of this method is that, since a user's session risk score is based on individual event-level and session-level risk probabilities for domains and not risk points associated with triggered rules, increasing the number of event-feature indicators and session-feature indicators over time does not create risk score inflation, unlike in a rule-based system where the session score would increase with more rules added over time. Instead, it likely increases the accuracy of the event-level risk probabilities and session-level probabilities.

In certain embodiments, the Bayes risk probabilities may be calculated more computationally efficiently by dividing event-feature indicators for a domain into a plurality of groups to obtain a subset of event-feature indicators for each group and then calculating probabilities associated with a Bayes risk for each of the groups. The same may be done with respect to session-feature indicators.

BRIEF DESCRIPTION OF THE DRAWINGS

FIG. 5 illustrates a table that shows an example of assigning event-level features for the VPN domain to four conditionally independent groups

DETAILED DESCRIPTION OF THE PREFERRED EMBODIMENTS

The present disclosure describes a self-learning system, method, and computer program for detecting cybersecurity threats in a computer network based on anomalous user behavior, where user events are tracked across multiple network domains. The method is performed by a computer system that detects cyber threats in a network and performs a risk assessment of user network activity.

1. Method for Detecting Cybersecurity Risks Using Multi-Domain Data

Figure 1:
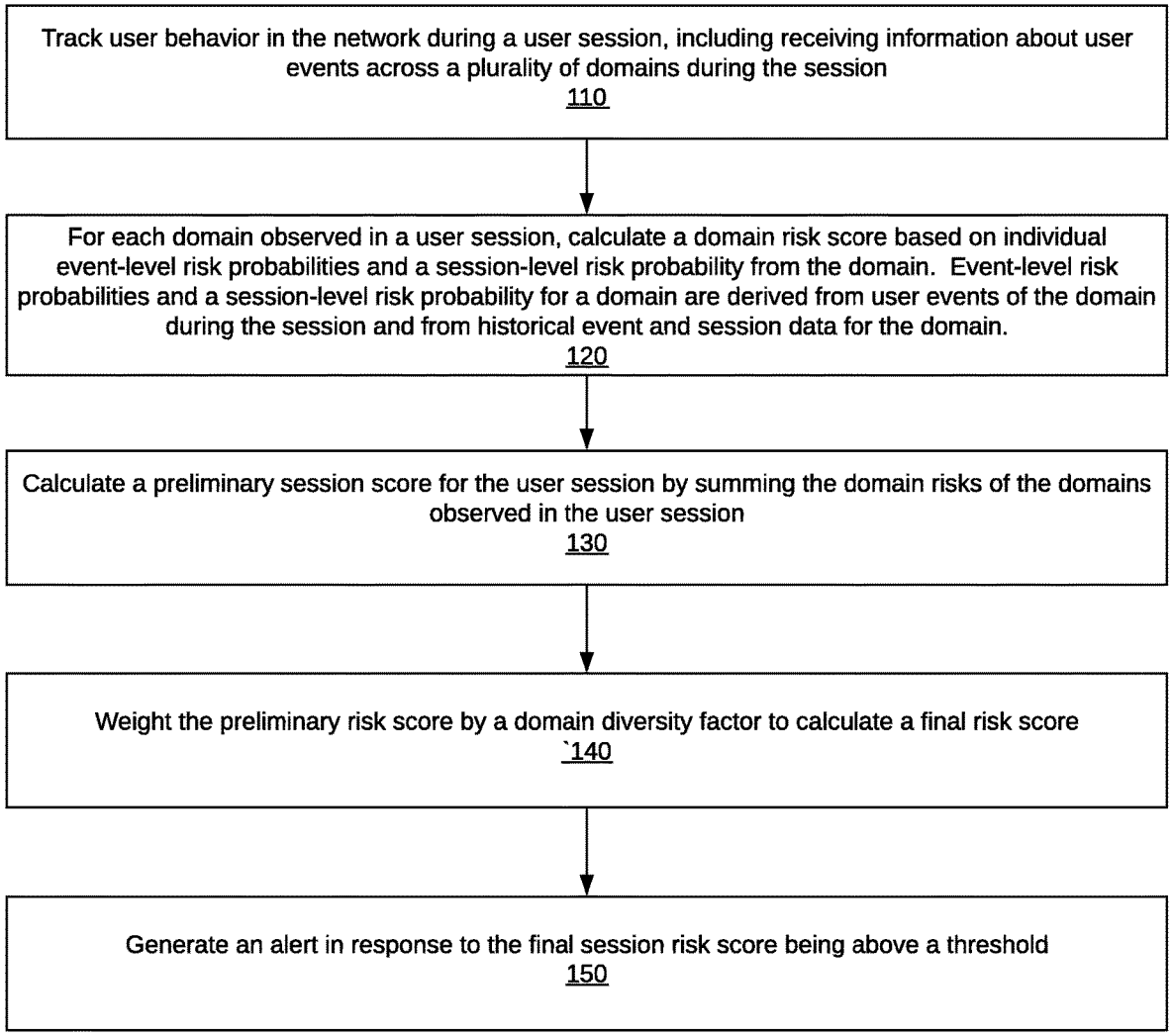
FIG. 1 is a flowchart that illustrate a method, according to one embodiment, for detecting cybersecurity threats in a computer network based on anomalous user behavior and multi-domain data.

FIG. 1 illustrates a method for detecting cybersecurity threats in a computer network based on anomalous user behavior and multi-domain data. The system tracks user behavior in the network during a session S (step 110). In one embodiment, a session is a period of time, such as a 24-hour period. In another embodiment, a session begins at a user's logon to the network and ends at the user's subsequent logout or at the end of a period of time (e.g., a 24-hour period), whichever occurs first. Tracking user behavior includes receiving information about user events across a plurality of data domains during a session. The system may receive event information from a number of different data domains, such VPN systems, emails systems, proxy/firewall systems, physical access systems, etc. The event information may be received in the form of event logs from internet technology (IT) network systems and security systems. The system normalizes event logs from the various event log sources.

Data domains are denoted herein as $C_v$, where v is the domain index, $1 \leq v \leq V$, and V is the total number of domains from which user activity is monitored. A user session comprises a collection of a user's observable events $\{e_t^v\}$, where t is the event index ($1 \leq t \leq T$), T is the total number of events observed in the session, and v is the domain to which the event belongs.

For each domain observed in a user session (i.e., for each domain in which at least one user event is observed in the session), the system calculates a domain risk score as the sum of the individual event-level risk probabilities ("event-level risks") and a session-level risk probability (a "session-level risk") from the domain (step 120). The individual event-level risks $\{R_{e_t}^v\}$ and the session-level risk $R_s^v$ for a domain are derived from user events of the domain during the session and from historical event and session data for the user and the global network population in the domain. A domain risk score may be expressed mathematically as follows:

$$R_{C_v} = \sum_t^T R_{e_t}^v + \alpha R_s^v$$

Where $\alpha$ allows some flexibility in tuning the relative contributions of event-level and session-level risk. $R_{C_v}$ is the domain risk score for a domain v.

The system then calculates a preliminary session risk score for the user session by summing the domain risk score(s) for the domain(s) observed in the user session (step 130). The preliminary session risk score $R_{prelim\_total}$ may be expressed mathematically as follows:

$$R_{prelim\_total} = \sum_{C_v} R_{C_v}$$

The system weights the preliminary risk score by a domain diversity factor $W_D$ to calculate a final risk score for the user session (step 140). This final risk score may be expressed mathematically as:

$$R_{total} = R_{prelim\_total} * W_D$$

In certain embodiments, the session risk score is updated in substantially real time throughout a session as the system receives information about user events. In one embodiment, the domain diversity factor is used to preference, in terms of risk ranking, sessions in which rarer domains or rarer combinations of domains are observed. Occurrences of domains that are statistically dependent upon each other are less surprising than domains that are independent from one another. Therefore, all other factors being equal, a combination of independent domains provides more information and is of higher interest than a combination of domains that are relatively dependent on each other.

The system generates an alert if the session risk score exceeds a threshold (step 150). For example, the system may generate an alert for sessions with the highest 5% risk scores. The alert may be displayed in a user interface for the system, typically for the benefit of IT personnel. The alert display may include a list of the events in the applicable user session or a summary of the events most responsible for the elevated risk. The alert display may include a timeline of key events in the user session.

2. Calculating an Event-Level Risk Score for an Event of a Domain

2.1 Event-Feature Indicators

In one embodiment, the individual event-level risk $R_{e_t}^v$ is a Bayes risk probability assessed based on a vector of event-feature indicators derived from the event $e_t$ of the domain $C_v$ and from historical event data for the user and the global network population in the domain. Each domain is associated with a unique set of event-feature indicators. Event-feature indicators are a collection of event-level anomaly indicators and event-level context indicators, which are described in more detail below.

2.1.1 Anomaly Indicators

An event-level anomaly indicator indicates whether an aspect or a data element of an event is unusual with respected to a tracked entity behavior profile. A behavior profile is a historical description of the tracked data that is continuously updated. For example, a behavior profile may be in form of a histogram.

Where the tracked data is categorical (e.g., types of assets accessed by a user), the behavior profile may be time-based with the most recently accessed times tracked for the values of the data. For example, a behavior profile tracking a user's accessed assets comprises a list of tuples of an asset and the timestamp associated with the most recent access of the asset.

Where the tracked data is numerical (e.g., email size), the behavior profile may be a description of past observed values via a boxplot method or a parametric probability function. For example, a behavior profile tracking the size of emails a user sends may use a boxplot to describe the interquartile range of the sample.

Behaviors tracked by profiles are simple to understand and useful for interpretability. In certain embodiments, the system builds a comprehensive set of behavior profiles for all domains per user, as well as per user's peer group and per the entire organization. A user may belong to multiple peer groups. For example, he/she may belong to a department peer group, a title peer group, a geo-location peer group, a security-access peer group, etc.

In one embodiment, the value of an event-level anomaly indicator is either TRUE (1) or FALSE (0), depending on whether the current data is anomalous. The value of an anomaly indicator may be determined by an anomaly detector, which is a software routine that checks whether a current data item is considered new, unusual, or an outlier based on the applicable behavior profile. In the case of categorical data, an anomaly detector returns TRUE if the data is new to the profile or was last seen more than N days ago, where a TRUE value means the current data (i.e., the event data) is anomalous. In certain embodiments, N=30. However, if the data in question is new to the entire user population (e.g., a newly-deployed asset in the enterprise is accessed for the first time), the anomaly detector does not consider this an anomaly. The data in a behavior profile must be matured or "converged" before it is used for anomaly evaluations. In certain embodiments, the data has converged if it has aged more than M days (e.g., M=5).

In the case of numerical data, the anomaly detector returns TRUE if the data is considered an outlier that exceeds a certain threshold in a profile distribution.

2.1.2 Context Indicators

In addition to the event-level anomaly indicators, static and factual context data serve as features of an event for risk scoring. Context data is available from various IT data sources, such as a Lightweight Directory Access Protocol (LDAP) database or other IT operation database. Examples of context data include a user's privileged access status over certain assets and whether an asset is a workstation or a server.

An event-level context indicator indicates whether or not a certain fact is true for the event. In assessing the risk of an event, the role of context indicators is to provide context to calibrate the degree of risk due to positive anomaly indicators. For example, the risk due to a user running an unusual process is best calibrated by whether the machine on which the process is run is a critical server or a workstation.

Figure 2:
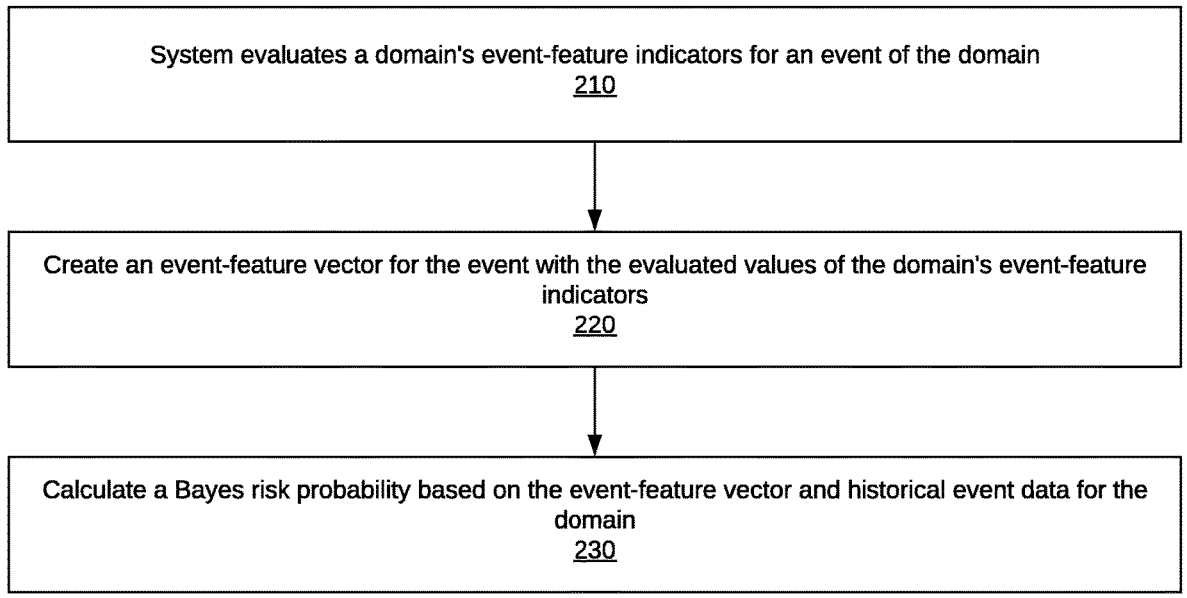
FIG. 2 is a flowchart that illustrate a method, according to one embodiment, for calculating an event-level risk probability for an event of a domain.

2.1.3 Using Anomaly Indicators and Context Indicators to Assess an Event-Level Risk FIG. 2 illustrate a method for calculating an event-level risk $R_{e_t}^v$ for an event et of a domain $C_v$. As stated above, each domain is associated with a unique set of event-feature indicators comprising event-level anomaly indicators and event-level context indicators. For an event $e_t$ of a domain $C_v$, the system evaluates the event-feature indicators associated with domain $C_v$ (step 210). The system creates an event-feature vector for event $e_t$ with the evaluated values for the event-feature indicators (step 220). The system then calculates a Bayes risk based on the event-feature vector and historical event data for the domain (230). This Bayes risk is the event-level risk for event $e_t$ of domain $C_v$. A method for calculating a Bayes risk is described in further detail below.

3. Calculating a Session-Level Risk Score Based Events of a Domain

In one embodiment, for each domain observed in a user session, the session-level risk $R_s^v$ for the domain $C_v$ is a Bayes risk based on a vector of session-feature indicators derived from events of the domain $C_v$ in the user session and from historical session data for the user and the global network population in the domain. Each domain is associated with a unique set of session-feature indicators. Similar to event-feature indicators, session-level feature indicators comprise session-level anomaly indicators and session-level context indicators. An example of session-level context indicator is whether the session is a VPN session. Events from a session are aggregated to build session-based behavior profiles and session-level anomaly indicators for each domain in the network. Examples of session-level behaviors tracked and assessed for anomalies are the number of bytes transferred into a user session or the number of assets accessed in a session. The value of a session-level anomaly indicator is determined by an anomaly detector, which is a software routine that checks whether a current data item is considered new, unusual, or an outlier in accordance with the applicable session-level behavior profile.

Figure 3:
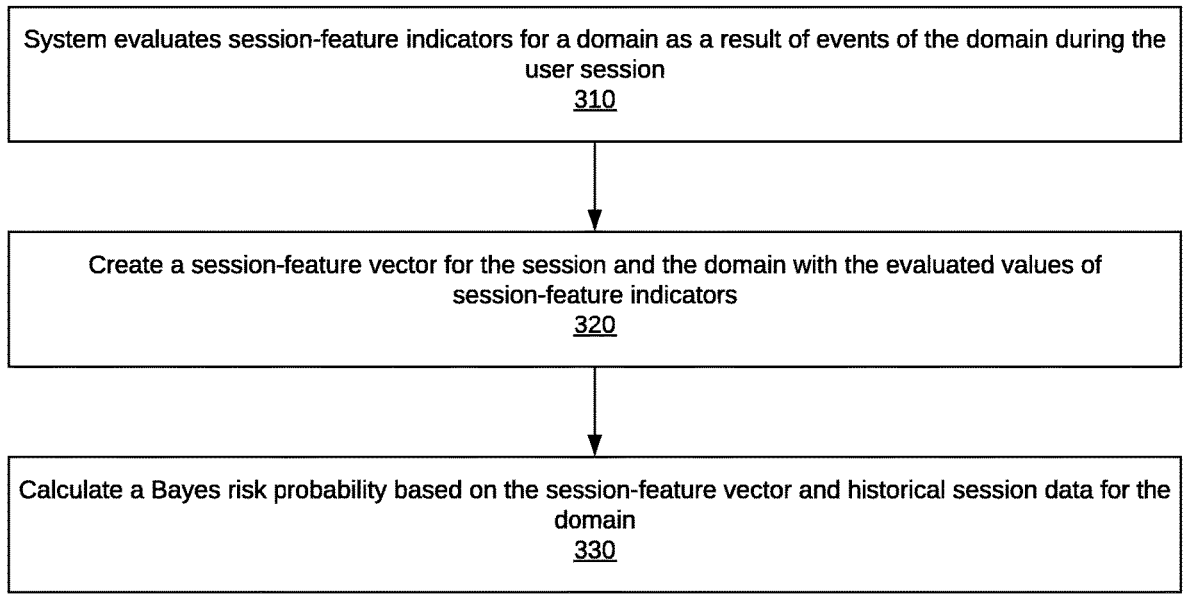
FIG. 3 is a flowchart that illustrate a method, according to one embodiment, for calculating a session-level risk probability for an event of a domain.

FIG. 3 illustrates a method for calculating a session-level risk for each domain observed in a session. For each domain observed in the session, the system evaluates the unique session-feature indicators for the domain as a result of events of the domain during the user session (step 310). The system creates a session-feature vector for the session and the domain with the evaluated values for the session-feature indicators (step 320). The system then calculates a Bayes risk based on the session-feature vector and historical session data for the domain (330). This Bayes risk is the session-level risk for the session and the domain.

4. Bayes Modeling

This section sets forth a method for calculating a Bayes risk. The method applies to both event-level and session-level risks.

With respect to the Bayes formulas below, let R denote either an event-level risk $R_{e_t}^v$ or a session-level risk $R_s^v$. Let $\vec{f}=(f_1, f_2, \ldots f_l)$ denote either an event-feature vector or a session-feature vector of length l, depending on whether an event-level risk or a session-level risk is being calculated.

R is defined as the user's posterior probability that the event or session is malicious or of high interest given the feature vector. "Malicious or of high interest" is denoted as M, and "legitimate or of no interest" is denoted as L. Therefore, R is computed as follows:

$$R := P(M \mid \vec{f}) = \frac{P(\vec{f} \mid M)P(M)}{P(\vec{f} \mid M)P(M) + P(\vec{f} \mid L)P(L)}$$

Where:

$P(M|\vec{f})$ is the posterior probability that the event or session is malicious or of high interest given the feature vector $\vec{f}$;

$P(\vec{f}|M)$ is the likelihood of observing the feature vector in a malicious/high interest event or session.

$P(\vec{f}|L)$ is the likelihood of observing the feature vector in a legitimate/low interest event or session.

$P(M)$ is the likelihood of a malicious/high interest event or session;

$P(L)$ is the likelihood of a legitimate/low interest event or session.

In one embodiment, $P(L)$ and $P(M)$ are assumed to be of equal likelihood and are set to 0.5.

In one embodiment, in computing $P(\vec{f}|L)$ in training, it is assumed that the observed historical data is largely normal and legitimate and that the volume of any present malicious or anomalous events is negligible and statistically insignificant for the purposes of the risk calculation.

The data used to computer $P(\vec{f}|L)$ is the user's local sufficient statistics smoothed by the population's global sufficient statistics:

$$P(\vec{f} \mid L) = \frac{(1-\beta) * C_0 * \text{Count}_u(\vec{f}) + \beta * \text{Count}_g(\vec{f})}{(1-\beta) * C_0 * \sum_{\vec{f}'} \text{Count}_u(\vec{f}') + \beta * \sum_{\vec{f}'} \text{Count}_g(\vec{f}')}$$

$$\text{Where: } C_0 = \frac{\sum_{\vec{f}'} \text{Count}_g(\vec{f}')}{\sum_{\vec{f}'} \text{Count}_u(\vec{f}')}$$

$\text{Count}_u(\vec{f})$ is the count of sessions from the user's own historical session in which the feature vector $\vec{f}$ is observed.

$\Sigma_{\vec{f}'}\text{Count}_u(\vec{f}')$ is the sum of all such counts from all possible observed feature vectors with the same user's history.

$\text{Count}_g(\vec{f})$ is the the count of sessions from all users in which the feature vector $\vec{f}$ is observed.

$\Sigma_{\vec{f}'}\text{Count}_g(\vec{f}')$ is the sum of all $\text{Count}_g(\vec{f})$ counts from all possible observed feature vectors across the user population.

$C_0$ is a scaling factor so that the mass of local sufficient statistics has 1-to-1 equal to that of the global sufficient statistics.

$\beta$ is a parameter between 0 and 1 controlling the smoothing in the population-global vs. user-local sufficient statistics.

As seen from the above formula, a domain risk is learned from both the user's current and historical observed events in the domain and the historical activity of the wider (global) user population in the domain.

The likelihood $P(\vec{f}|M)$ is assumed to be uniform across all observed featured vectors, unless preferred otherwise by expert assignment or analyst feedback. Indeed, the Bayes interference scheme allows expert opinion to adjust, and user feedback to update, $P(\vec{f}|M)$ in a production setting. In absence of expert knowledge or analyst feedback, the risk in the above equation simply reflects the degree of rarity or anomalousness of the feature vector in predicting M.

Figure 4:
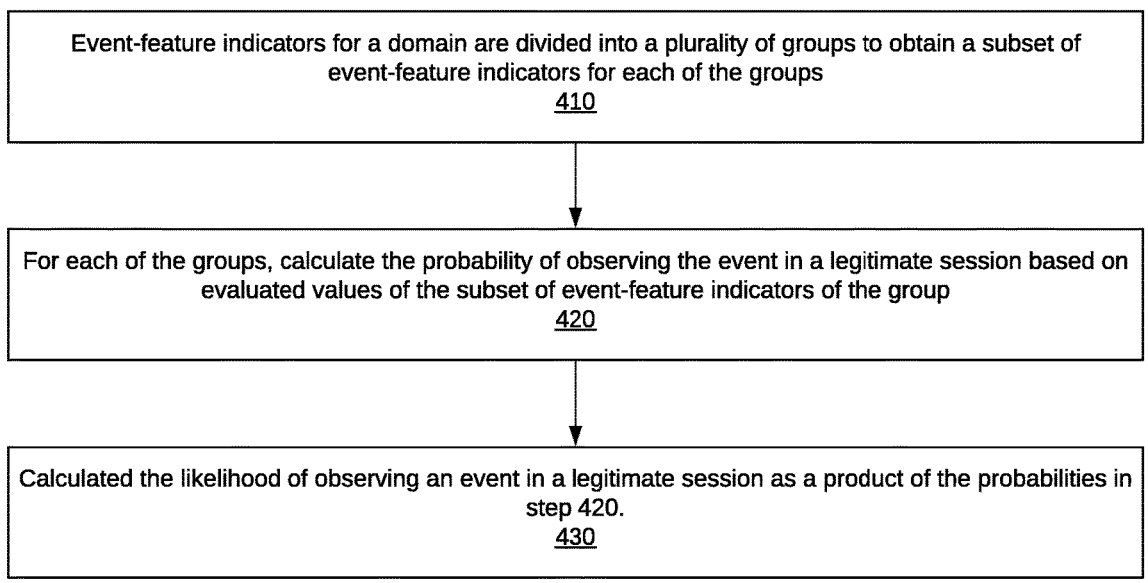
FIG. 4 is a flowchart that illustrates a method, according to one embodiment, for calculating the likelihood of observing a particular event in a legitimate session.

5. Computationally Efficient Method for Calculating $P(\vec{f}|L)$ and $P(\vec{f}|M)$ As indicated above, to compute a Bayes event-level risk, the system evaluates a likelihood of observing the applicable event in a legitimate session. In other words, the system computes $P(\vec{f}|L))$ where $\vec{f}$ is an event-feature vector. While it is possible to calculate the likelihood directly regardless of the size of $\vec{f}$, it is more computationally efficient to exploit the conditional independence of event-feature indicators. FIG. 4 illustrates this more computationally-efficient method.

The event-feature indicators are divided into a plurality of groups to obtain a subset of event-feature indicators for each of the groups (step 410). FIG. 5 illustrates a table that shows an example of assigning event-level features for the VPN domain to four conditionally independent groups. For each of the groups, the system calculates the likelihood observing the event in a legitimate session based on evaluated values of the subset of event-feature indicators of the group (step 420). $P(\vec{f}|L))$ is then calculated as the product of the probabilities from step 420 (step 430). This can be denoted mathematically as follows:

$$P(\vec{f} \mid L)) = \prod_{j=1}^{J} P(\vec{g}_i \mid L))$$

Where there are J conditional independent groups $\vec{g}_i$, each consisting of a non-overlapping subset of features $\vec{f}$.

The benefit of organizing event-feature indicators into independent groups are at least twofold. First, because each group has a manageable smaller number of feature indicators, the data fragmentation that comes with jointly estimating the likelihood of a large number of features is reduced. Second, structuring the features to conditionally independent groups improves the interpretability of the outcome. Given a high scoring session, rather than presenting the entire feature f, where size l may be large, the system can selectively present only the critical subset of event-feature indicators that significantly contributed to the session score, improving the readability of the outcome.

In one embodiment, the following guidelines are followed in dividing event-feature indicators into groups:

Anomaly indicators using behavior profiles that are built on similar data are grouped together, since they are not expected to be independent. For example, anomaly indicators that use behavior profiles related to user's source machines may be together in one group, and anomaly indicators related to the destination machine to which the user activity is intended may be together in another group.

Anomaly indicators for a user, a user's peers, and the organization on similar activity may be grouped together since they are not independent. For example, if the current user event is anomalous to the user's department profile, it must be anomalous for the user himself, though not necessarily vice versa.

Context indicators may be joined with anomaly indicators if the context indicators are useful to calibrate the risk from triggered anomaly detectors. For example, the context of whether a user is an administrator is grouped with various anomaly indicators associated with unusual access to an asset from a user, the user's peer, or the organization. The risk associated with unusual access depends on whether the user is administrator or not.

The method described in this section can also be applied to computing $P(\vec{f}|L))$ for session-level risks too by dividing session-level indicators into groups.

To compute a Bayes event-level risk, the system also evaluates a likelihood of observing the applicable event in a malicious session. The method described in this section also can be applied to calculating $P(\vec{f}|M))$ for both event-level risks and session-level risks.

6. Precomputing Event-Level and Session-Level Risks in a Training Phase

In one embodiment, during a training phase, an event-level Bayes risk $R_{e_t}^v$ and a session-level Bayes risk $R_s^v$ are computed for each possible event-feature vector and session-feature vector in each domain. During evaluation of a user session, these risks are simply looked up based on the event and session feature vectors derived from the events of the user session. The pre-computed event-level risks and session-level risks are periodically updated (e.g., every 24 hours) to reflect the most current network data.

7. Domain Diversity Factor

In one embodiment, the domain diversity factor is used to preference, in terms of risk ranking, sessions in which rarer domains or a rarer combination of domains are observed. For example, the domain diversity factor may be computed as follows:

$$W_D = \frac{\Pi_v^V P(C_v)}{P(C_1, C_2, \ldots C_V)}$$

Where $C_v$ is the vth domain in which an of the anomaly indicators from the domain are TRUE in a user session. Under this calculation, $W_D$ has the property that when some domains are dependent to one another, it will be less than 1.0, decreasing the session risk score. Otherwise, when domains observed in the session are truly independent such that they provide maximum information in a session, $W_D$, will be 1.0, preserving the session score.

8. General

The methods described with respect to FIGS. 1-5 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for detecting cybersecurity threats in a computer network based on anomalous user behavior, wherein user events are tracked across multiple network domains, the method comprising:

tracking user behavior in the network during a user session, wherein tracking user behavior includes receiving information about user events across a plurality of domains during the session;

for each domain observed in a user session, calculating a domain risk score based on individual event-level risk probabilities and a session-level risk probability from the domain, wherein the individual event-level risk probabilities and the session-level risk probability for a domain are derived from user events of the domain during the session and from historical event and session data for the domain;

calculating a preliminary session risk score for the user session by summing the domain risk scores of the domains observed in the user session;

weighting the preliminary session risk score based on a domain diversity factor to calculate a final risk score for the user session; and generating an alert in response to the final session risk score being above a threshold.

2. The method of claim 1, wherein each domain is associated with a unique set of event-feature indicators, and wherein an event-level risk probability for an event of a domain is a Bayes risk probability assessed based on evaluated values of the domain's event-feature indicators for the event and based on historical event data for the domain.

3. The method of claim 2, wherein, for each domain, the event-feature indicators for the domain comprise event-level anomaly indicators and event-level context indicators.

4. The method of claim 2, wherein each domain is associated with a unique set of session-feature indicators, and wherein a session-level risk probability for a domain is a Bayes risk probability assessed based on historical session data for the domain and based on evaluated values of the session-feature indicators for the domain as a result of events of the domain during the user session.

5. The method of claim 4, wherein, for each domain, the session-feature indicators for the domain comprise session-level anomaly indicators and session-level context indicators.

6. The method of claim 2, wherein calculating the Bayes risk probability comprises calculating a likelihood of observing the event in a legitimate session and a likelihood of observing the event in a malicious session.

7. The method of claim 6, wherein the event-feature indicators for a domain are divided into a plurality of groups to obtain a subset of event-feature indicators for each of the groups, and wherein, for each domain, calculating the likelihood of observing the event in a legitimate session comprises:
  (a) for each of the groups associated with the domain, calculating the probability of observing the event in a legitimate session based on evaluated values of the subset of event-feature indicators of the group with respect to the event; and
  (b) calculating the product of the probabilities from step (b).

8. The method of claim 6, wherein the event-feature indicators for a domain are divided into a plurality of groups to obtain a subset of event-feature indicators for each of the groups, and wherein, for each domain, calculating the likelihood of observing the event in a malicious session comprises:
  (a) for each of the groups, assigning based on domain knowledge or calculating based on data the probability of observing the event in a malicious session based on evaluated values of the subset of event-feature indicators of the group with respect to the event; and
  (b) calculating the product of the probabilities from step (a).

9. The method of claim 1, wherein the domain diversity factor is configured to preference, in terms of risk ranking, sessions in which rarer domains or rarer combinations of domains are observed.

10. A non-transitory computer-readable medium comprising a computer program, that, when executed by a computer system, enables the computer system to perform the following method for detecting cybersecurity threats in a computer network based on anomalous user behavior, wherein user events are tracked across multiple network domains, the method comprising:
  tracking user behavior in the network during a user session, wherein tracking user behavior includes receiving information about user events across a plurality of domains during the session;
  for each domain observed in a user session, calculating a domain risk score based on individual event-level risk probabilities and a session-level risk probability from the domain, wherein the individual event-level risk probabilities and the session-level risk probability for a domain are derived from user events of the domain during the session and from historical event and session data for the domain;
  calculating a preliminary session risk score for the user session by summing the domain risk scores of the domains observed in the user session;
  weighting the preliminary session risk score based on a domain diversity factor to calculate a final risk score for the user session; and
  generating an alert in response to the final session risk score being above a threshold.

11. The non-transitory computer-readable medium of claim 10 wherein each domain is associated with a unique set of event-feature indicators, and wherein an event-level risk probability for an event of a domain is a Bayes risk probability assessed based on evaluated values of the domain's event-feature indicators for the event and based on historical event data for the domain.

12. The non-transitory computer-readable medium of claim 11, wherein, for each domain, the event-feature indicators for the domain comprise event-level anomaly indicators and event-level context indicators.

13. The non-transitory computer-readable medium of claim 11, wherein each domain is associated with a unique set of session-feature indicators, and wherein a session-level risk probability for a domain is a Bayes risk probability assessed based on historical session data for the domain and based on evaluated values of the session-feature indicators for the domain as a result of events of the domain during the user session.

14. The non-transitory computer-readable medium of claim 13, wherein, for each domain, the session-feature indicators for the domain comprise session-level anomaly indicators and session-level context indicators.

15. The non-transitory computer-readable medium of claim 11, wherein calculating the Bayes risk probability comprises calculating a likelihood of observing the event in a legitimate session and a likelihood of observing the event in a malicious session.

16. The non-transitory computer-readable medium of claim 15, wherein the event-feature indicators for a domain are divided into a plurality of groups to obtain a subset of event-feature indicators for each of the groups, and wherein, for each domain, calculating the likelihood of observing the event in a legitimate session comprises:
  (a) for each of the groups associated with the domain, calculating the probability of observing the event in a legitimate session based on evaluated values of the subset of event-feature indicators of the group with respect to the event; and
  (b) calculating the product of the probabilities from step (b).

17. The non-transitory computer-readable medium of claim 15, wherein the event-feature indicators for a domain are divided into a plurality of groups to obtain a subset of event-feature indicators for each of the groups, and wherein, for each domain, calculating the likelihood of observing the event in a malicious session comprises:
  (a) for each of the groups, assigning based on domain knowledge or calculating based on data the probability of observing the event in a malicious session based on evaluated values of the subset of event-feature indicators of the group with respect to the event; and
  (b) calculating the product of the probabilities from step (a).

18. The non-transitory computer-readable medium of claim 10, wherein the domain diversity factor is configured to preference, in terms of risk ranking, sessions in which rarer domains or rarer combinations of domains are observed.

19. A computer system for detecting cybersecurity threats in a computer network based on anomalous user behavior, wherein user events are tracked across multiple network domains, the system comprising:
  one or more processors;
  one or more memory units coupled to the one or more processors, wherein the one or more memory units store instructions that, when executed by the one or more processors, cause the system to perform the operations of:
  tracking user behavior in the network during a user session, wherein tracking user behavior includes receiving information about user events across a plurality of domains during the session;
  for each domain observed in a user session, calculating a domain risk score based on individual event-level risk probabilities and a session-level risk probability from the domain, wherein the individual event-level risk probabilities and the session-level risk probability for a domain are derived from user events of the domain during the session and from historical event and session data for the domain;

calculating a preliminary session risk score for the user session by summing the domain risk scores of the domains observed in the user session;

weighting the preliminary session risk score based on a domain diversity factor to calculate a final risk score for the user session; and generating an alert in response to the final session risk score being above a threshold.

20. The system of claim 19 wherein each domain is associated with a unique set of event-feature indicators, and wherein an event-level risk probability for an event of a domain is a Bayes risk probability assessed based on evaluated values of the domain's event-feature indicators for the event and based on historical event data for the domain.

21. The system of claim 20, wherein, for each domain, the event-feature indicators for the domain comprise event-level anomaly indicators and event-level context indicators.

22. The system of claim 20, wherein each domain is associated with a unique set of session-feature indicators, and wherein a session-level risk probability for a domain is a Bayes risk probability assessed based on historical session data for the domain and based on evaluated values of the session-feature indicators for the domain as a result of events of the domain during the user session.

23. The system of claim 22, wherein, for each domain, the session-feature indicators for the domain comprise session-level anomaly indicators and session-level context indicators.

24. The system of claim 20, wherein calculating the Bayes risk probability comprises calculating a likelihood of observing the event in a legitimate session and a likelihood of observing the event in a malicious session.

25. The system of claim 24, wherein the event-feature indicators for a domain are divided into a plurality of groups to obtain a subset of event-feature indicators for each of the groups, and wherein, for each domain, calculating the likelihood of observing the event in a legitimate session comprises:

(a) for each of the groups associated with the domain, calculating the probability of observing the event in a legitimate session based on evaluated values of the subset of event-feature indicators of the group with respect to the event; and (b) calculating the product of the probabilities from step (b).

26. The system of claim 24, wherein the event-feature indicators for a domain are divided into a plurality of groups to obtain a subset of event-feature indicators for each of the groups, and wherein, for each domain, calculating the likelihood of observing the event in a malicious session comprises:

(a) for each of the groups, assigning based on domain knowledge or calculating based on data the probability of observing the event in a malicious session based on evaluated values of the subset of event-feature indicators of the group with respect to the event; and (b) calculating the product of the probabilities from step (a).

27. The system of claim 19, wherein the domain diversity factor is configured to preference, in terms of risk ranking, sessions in which rarer domains or rarer combinations of domains are observed.

* * * * *